Feb. 23, 1926.
J. B. JOHNSON
ELECTRICAL TESTING
Filed August 14, 1923
1,574,350
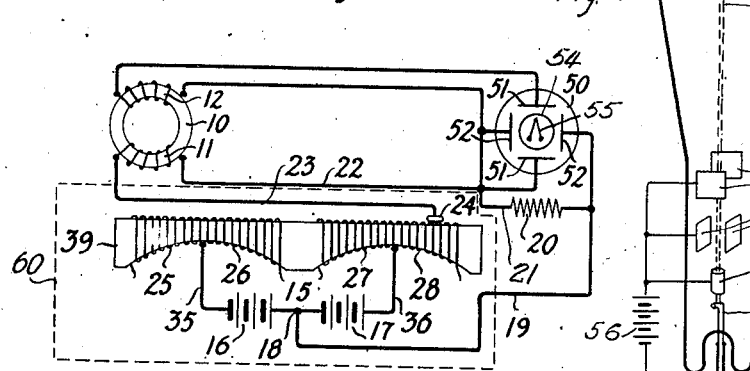
Fig.1
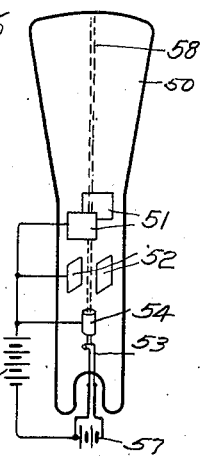
Fig.6
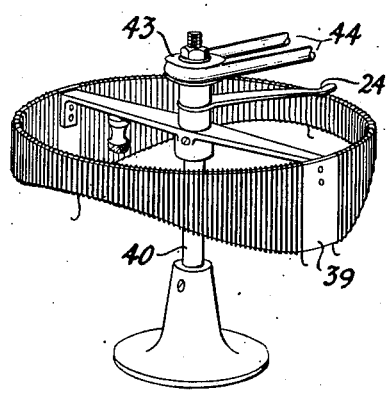
Fig.2
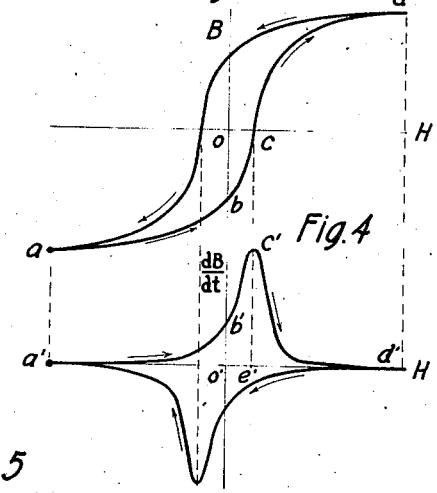
Fig.3
Fig.4
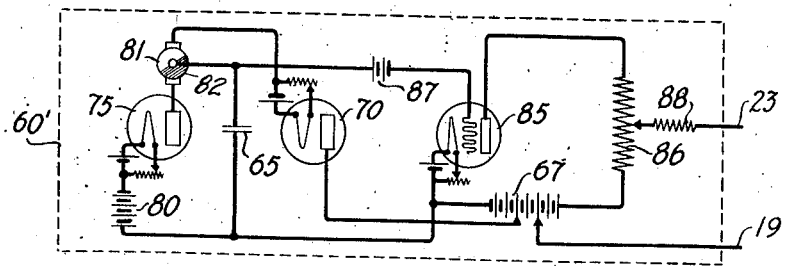
Fig.5
Inventor
John B. Johnson
by Joel C. R. Palmer, Atty.

Patented Feb. 23, 1926.

1,574,350

UNITED STATES PATENT OFFICE.

JOHN B. JOHNSON, OF ELMHURST, NEW YORK, ASSIGNOR TO WESTERN ELECTRIC COMPANY, INCORPORATED, OF NEW YORK, N. Y., A CORPORATION OF NEW YORK.

ELECTRICAL TESTING.

Application filed August 14, 1923. Serial No. 657,422.

To all whom it may concern:

Be it known that I, JOHN B. JOHNSON, a citizen of the United States, residing at Elmhurst, in the county of Queens, State of New York, have invented certain new and useful Improvements in Electrical Testing, of which the following is a full, clear, concise, and exact description.

The invention relates to electrical measurements, and its object is to determine hysteresis losses, especially in closed magnetic circuits.

In accordance with the invention the sample is subjected to a magnetizing field increasing with time in a known manner from a maximum negative field value to a maximum positive field value, and decreasing with time from said maximum positive value to said maximum negative value, and a graph is made of the relation between the varying field and the time rate of change of the resulting induction in the sample, the hysteresis loss being determined from the area between the graph and its H axis in accordance with the known manner of variation of the magnetizing field with time. By way of example, the detailed description hereinafter sets forth means for passing through a resistance and the magnetizing winding of the sample an alternating current increasing at a constant time rate from a maximum negative field value to a maximum positive field value for a half cycle and decreasing at said rate from said maximum value to said minimum value for the remaining half of the cycle, the voltage across the resistance being applied across one of the orthogonally arranged pairs of deflector plates of a Braun tube and the voltage generated in a winding on the sample due to the changing induction in the sample being applied across the other pair of deflector plates, so that, as explained hereinafter, the area between the curve traced by the beam of electrons or cathode rays of the tube and the H axis of the curve equals the change of induction at any time, thus enabling the plotting of the ordinary hysteresis loop the area of which is proportional to the hysteresis loss in the sample. Although in the practice of the invention the ordinary galvanometer type of oscillograph can be used instead of the Braun tube or cathode ray oscillograph, the use of the latter is preferable because with the galvanometer oscillograph the deflection of the moving element is produced by only one variable, the time rate of change of induction in the sample, and consequently it is necessary to provide a moving film or mirror synchronized with the cyclical changes in the magnetizing field that produces the changes of induction.

Fig. 1 of the accompanying drawings represents schematically a circuit embodying the invention; Fig. 2 is a perspective view of a rheostat employed in the circuit of Fig. 1; Fig 3 is an ordinary type of hysteresis loop; Fig. 4 is a curve traced by an oscillograph in the circuit of Fig. 1, and from which the loop of Fig. 3 may be constructed; Fig. 5 is a diagrammatic showing of a magnetizing current supply means which may replace the means shown in Fig. 1 for supplying magnetizing current for the sample to be tested; and Fig. 6 is a diagrammatic showing of a cathode ray of oscillograph indicated in the circuit of Fig. 5.

In Fig. 1 is shown a ring shaped sample 10 which has a magnetizing winding 11 of $n_1$ turns and a secondary winding 12 of $n_2$ turns. Magnetizing current from a source 15 comprising D. C. generators 16 and 17 is passed through a circuit from point 18 on source 15 through a lead 19, a non-inductive resistance 20, leads 21 and 22, the winding 11, a lead 23, a contact 24 movable along four resistances 25, 26, 27 and 28, through one of these resistances, through one of the leads 35 and 36 and one of the generators 16 and 17, back to the point 18. The magnetizing current will be regarded a positive when flowing through 11 from left to right (or in other words when contact 24 is on one of the resistances 25 and 26; and as negative when flowing from right to left (or in other words when contact 24 is on one of the resistances 27 and 28).

The resistances 25 to 28 are of sufficiently large values, relative to the impedances of resistance 20 and winding 11, to insure that, in each position of contact 24 on the resistances 25 to 28, the effect of the impedances of 20 and 11 upon the value of the magnetizing current is so small as to be negligible. The contact 24 is preferably moved along the resistances 25 to 28 at a uniform speed.

These resistances, and the core 39 on which they are wound are indicated as developed in the plane of the paper in the diagrammatic showing of Fig. 1. Preferably the resistances are made in the form indicated in Fig. 2, wherein is shown a ring shaped core 39, of varying width, supported by stand 40, the resistances 25 to 28 being wound on core 39 so that the movable contact 24 can be rotated along the resistances, as for instance by a pulley 43 and belt 44.

In order that the magnetizing current I may cyclically vary at a constant time rate from a maximum negative current value to a maximum positive current value and back to the maximum negative value as the contact 24 is continuously rotated at a constant speed each quarter of the ring is given a width varying from point to point along the length of that quarter of the ring in accordance with the ordinates R of the rectangular hyperbola $R = \frac{c}{t}$, where $t$ is the time that contact 24 has been moving along that quarter of the ring and $c$ is a constant equal to the voltage E of source 16 or 17 divided by $k$, $k$ being the desired constant rate of change of magnetizing current with the time $t$; for if we call the resistance of the magnetizing circuit R (the impedances of 11 and 20 being negligible as explained above), then since it is desired to have the current increase or decrease at a constant time rate, that is, to have the current equal $kt$ where $k$ is a constant and $t$ is the time which the current has increased or decreased, we have $$I = \frac{E}{R} = kt; \quad R = \frac{E}{I} = \frac{E}{kt}.$$

The constant $k$ is determined as the slope of the time-current curve, or the maximum desired value of magnetizing current divided by the time required for the contact 24 to move over any one of the resistances 25 to 28, that is, over one quarter of the ring.

The reference character 50 designates a Braun tube having two orthogonal pairs of deflector plates 51 and 52, of which one pair, say the plates 51, are connected to the secondary winding 12 of the sample, and the other pair are connected across the resistance 20. The showing of the Braun tube is only schematic. The actual structure of a Braun tube which may be used is described in "Bell System Technical Journal", Volume 1, No. 2, pages 142–151, November 1922. As indicated in Fig. 6, the tube comprises a filamentary cathode 53 heated from a source of electro-motive force 57, and a tubular anode 54, supplied with potential from a source of electro-motive force 56. A portion of the electrons emitted from cathode 53 pass through the tubular anode 54 and between the two plates of each pair of deflector plates 52 and 51, in an electron stream 58, which forms a bright spot on the fluorescent inner surface of the large end of the tube and serves as a movable indicating element subject to deflection by the electro-motive forces impressed upon plates 52 and 51.

In the operation of the form of the invention shown in Fig. 1, when the contact 24 is rotated the magnetizing current cyclically varies at a constant time rate, from a maximum negative current value corresponding to the value of H at the lower tip, $a$, of an ordinary hysteresis loop such as is shown in Fig. 3, to a maximum positive current value corresponding to the value of H at the upper tip, $d$, of the hysteresis loop. For example, when contact 24 is at its nearest point of approach on resistance 27 to the junctions of resistances 27 and 28 the magnetizing current has its maximum negative value, this current flowing from generator 17 through lead 36, a small portion of resistance 27, contact 24, lead 23, winding 11, leads 22 and 21, resistance 20, and lead 19, back to generator 17. As the contact 24 moves over to its nearest point of approach on resistance 28 to the junction of 27 and 28, the magnetizing current retains its maximum negative value, the path of the current being the same as that just traced, except that from lead 36 to contact 24 it is through a small portion of resistance 28 instead of through a small portion of resistance 27. As the contact proceeds toward and reaches the free or open end of resistance 28 the current approaches and reaches its minimum negative value. While the contact 24 is passing from 28 to 25 the current is zero. As contact 24 passes onto the free end of resistance 25 the current assumes its minimum positive value, flowing from generator 16 through elements 19, 20, 21, 22, 11, 23, 24, 25, 35, and back to 16. As contact 24 proceeds toward the junction of 25 and 26 the current approaches its maximum positive value. As contact 24 proceeds from the junction of 25 and 26 toward the free end of 26 the current decreases to its minimum positive value. As 24 shifts to the free end of 27 the current assumes its minimum negative value; and as 24 again approaches the junction of 27 and 28 to complete its cycle, the current again approaches its maximum negative value to complete the current cycle.

Designating as $E_1$ the voltage applied to the oscillograph plates 52 due to the drop caused in resistance 20 by the flow of the magnetizing current I therethrough, and designating as $r$ the value of resistance 20, and designating as $n_1$ the number of turns in winding 11, we have for the value of the magnetizing field H to which the sample is subjected, $$H = \frac{4\pi n_1 I}{10L} = \frac{4\pi n_1 E_1}{10Lr} = K_1 E_1; \quad E_1 = \frac{H}{K_1}.$$

L being the length of the ring.

Designating as $E_2$ the voltage induced in the secondary winding 12 and applied to the plates 51 of the oscillograph and designating the magnetic flux in the sample as $\phi$, the magnetic flux per unit of cross-sectional area as B, the cross-sectional area of the sample as A, and the number of turns in winding 12 as $n_2$, we have $$E_2 = n_2 \frac{d\phi}{dt} = n_2 A \frac{dB}{dt}; \quad \frac{dB}{dt} = K_2 E_2; \quad E_2 = \frac{1}{K_2} \frac{dB}{dt}$$

The curve traced by the oscillograph as a result of the application thereto of the voltages $E_1$ and $E_2$ is shown in Fig. 4, and is a derivation of a hysteresis loop of the ordinary type such as is shown in Fig. 3. Beginning the magnetization cycle at $a$ and passing through $b$, $c$ and $d$, the derived curve follows the path $a'$, $b'$, $c'$, $d'$. Since the magnetizing field is postulated to vary with the time in such a way that $H = p(t - t_0)$ where $p$ is a constant, the area described between the derived curve and the H axis equals the total change of induction at any time; for $$\int_0^t E_2 dE_1 = \frac{1}{K_1 K_2} \int_0^t \frac{dB}{dt} dH$$

$$= \frac{p}{K_1 K_2} \int_0^t \frac{dB}{dt} dt = \frac{p}{K_1 K_2} (B_t - B_0)$$

The area $o'$ $b'$ $c'$ $e'$ is a measure of the retentivity of the material, while the distance $o'$ $e'$ between the $\frac{dB}{dt}$ axis and the peak of the curve represents the coercive force. The hysteresis loss can be obtained from the derived curve shown in Fig. 4 by constructing the ordinary hysteresis curve, such as that of Fig. 3, from the derived curve of Fig. 4 by graphic integration, and determining the hysteresis loss per cycle from the constructed curve in the ordinary way. The construction of the ordinary hysteresis loop from the curve of Fig. 4 is made by taking as the value of B for the value of H at any time the area described between the curve of Fig. 4 and the H axis up to that time.

It should be noted that the oscillographic method of measuring magnetic properties enables records to be obtained in a very short time, which is a feature especially valuable under certain circumstances which arise in practice, as for instance where large numbers of samples must be tested or where it is desired to test the changing properties of one sample at small time intervals.

The block 60' of Fig. 5 may replace the block 60 of Fig. 1 for supplying the sample with magnetizing current varying in the manner set forth above, the conductors 19 and 23 shown as leading from block 60' being for connection to the magnetizing winding 11 and the resistance 20 just as conductors 19 and 23 lead from the block 60 of Fig. 1 to winding 11 and resistance 20. In the apparatus of the block 60', a voltage varying in the manner in which the magnetizing current is to vary is produced across a condenser 65 by cyclically charging the condenser from a D. C. source 67 through a constant current device such for example as a two electrode thermionic vacuum tube 70 working a voltage saturation (that is, with the cathode temperature so low that all of the electrons emitted pass to the anode throughout the range of voltage applied to the tube), discharging the condenser through a similar constant current device 75, charging the condenser from a D. C. generator 80 through 75 to give the condenser a polarity opposite to that given it by the first charge, and discharging the condenser through 70 to complete the cycle. The temperatures of the cathode of the tubes 70 and 75 should be adjusted to give the same value of saturation current for the two tubes. The changing of the condenser 65 from the circuit of generator 67 and tube 70 to the circuit of generator 80 and tube 75, and vice versa, to accomplish the charging and discharging of the condenser are effected by a commutator 81 which may be rotated at any suitable speed.

The commutator is shown with a conducting segment 82 extending around approximately half of its circumference and an insulating segment extending around the other half. The conducting segment is always in contact with the lead to the upper plate of condenser 65. When the conducting segment contacts with the upper brush of the commutation, generator 67 charges the condenser through tube 70 so that the upper plate of the condenser is of positive polarity with respect to the lower plate, the condenser of course first discharging through 67 and 70 any charge of opposite polarity which it may have acquired from generator 80. Then if the conducting segment be rotated out of contact with the upper brush and into contact with the lower brush, the current through the condenser will reverse, flowing upwardly, the voltage across the condenser and the voltage of generator 80 acting cumulatively through tube 75 until the condenser has completely discharged whereupon the generator 80 continues to send current through the condenser in the upward direction to charge the condenser through 75 so that its lower plate is positive with respect to its upper plate. When the conducting segment leaves the lower brush and contacts with the upper brush the current through the condenser reverses, flowing downwardly, the voltage across the condenser and the voltage of generator 67 acting cumulatively through tube 70 until the condenser has completely discharged, whereupon a new cycle of the voltage variation across the condenser is begun by the generator 67 continuing to send current through the condenser in the downward direction to again charge the condenser through 70 so that its upper plate is positive with respect to the lower plate.

The alternating voltage thus produced across the condenser 65 is preferably applied to the input circuit of an electron discharge amplifier 85 to cause a variation of current in a resistance 86 in its output circuit. A grid battery 87 is shown for adjusting the steady potential of the grid of tube 85. The lead 23 is tapped off from resistance 86 through a resistance 88 sufficiently large to render negligible the effect of the impedances of winding 11 and resistance 20 upon the magnetizing current through 11, and the lead 19 is tapped off from generator 67 at such a point that when only the voltage of battery 87 is applied to the grid of tube 85, that is, when the voltage applied to the grid of 85 by the condenser 65 is zero, these two tap points are at the same potential and consequently the magnetizing current in winding 11 is zero. Resistance 86 is preferably sufficiently large to cause the plate-current grid potential characteristic of tube 85 to have a constant slope over a considerable working range; and the voltage of the grid battery 87 is preferably such that the normal plate current value, that is, the value of the plate current when only the voltage of battery 87 is applied to the grid, corresponds to the center of this working range.

When the rotation of commutator 81 causes an alternating voltage varying at a constant time rate to be applied to the grid of tube 85, the plate current of the tube varies at a constant time rate, above and below its normal value, and therefore there is applied to the circuit 88, 23, 11, 20, 19, an alternating voltage of the same wave shape, provided that the value of the resistance 88 is sufficiently high to cause the voltage drop in 86 due to the magnetizing current to be so small as to introduce no material distortion.

In order that the impedance of the magnetizing winding may be small, it is desirable in some cases to employ a magnetizing current of low frequency, for instance, only a few cycles per second, or even lower.

The charging or discharging of a condenser through a constant current path, to obtain a Braun tube sweep circuit voltage varying at a constant time rate is claimed in the application of W. A. Knoop, Serial No. 646,503, filed June 20, 1923, "sweep circuit for cathode ray oscillograph", assigned to the assignee of this application.

This invention is not limited to varying the magnetizing field at a constant time rate, but it is preferred to so vary the magnetizing field in order to facilitate interpretation of the curve traced by the oscillograph.

What is claimed is:

1. The method of measuring hysteresis which comprises subjecting the sample to be tested to a magnetizing field varying at a constant time rate and mapping the relation between the varying field and the time rate of change of the resulting magnetic induction in the sample.

2. The method of measuring hysteresis which comprises subjecting the sample to be tested to a varying magnetizing field, and subjecting an electron stream to orthogonal deflecting forces proportional respectively to said varying field and the time rate of change of the resulting induction in the sample.

3. The method of measuring hysteresis which comprises subjecting the sample to be tested to a magnetizing field varying at a constant time rate and subjecting an electron stream to orthogonal electric fields proportional respectively to said varying magnetizing field and the time rate of change of the resulting induction in the sample.

4. A magnetic testing system comprising means for subjecting the test sample to a varying electromagnetic field, and oscillographic means for mapping the relation between said varying field and the time rate of change of the resulting induction in the sample.

5. A magnetic testing system comprising means for subjecting the test sample to an electromagnetic field varying at a constant time rate, and oscillographic means for mapping the relation between said varying field and the time rate of change of the resulting magnetic induction in the sample.

6. A magnetic testing system comprising means for subjecting the test sample to a varying electromagnetic field, indicating means, and means for subjecting said indicating means to orthogonal electric fields proportional respectively to said varying field and the time rate of change of the resulting induction in the sample.

7. A magnetic testing system comprising means for subjecting the test sample to a varying magnetizing field, movable indicating means, and means for subjecting said indicating means to orthogonal deflecting forces proportional respectively to said varying field and the time rate of change of the resulting magnetic induction in the sample.

8. A magnetic testing system comprising means for subjecting the test sample to a varying magnetizing field, an oscillograph comprising a movable indicator, and means cooperating with said sample and said oscillograph for causing motion of said indicator with an amplitude which is a function of the time rate of change of the magnetic induction produced in the sample by said varying magnetizing field.

9. A magnetic testing system comprising means for subjecting the test sample to a magnetizing field varying at a constant time rate, an oscillograph comprising a movable indicator, and means cooperating with said sample and said oscillograph for causing motion of said indicator proportional to the time rate of change of the magnetic induction produced in the sample by said varying magnetizing field.

10. A magnetic testing system comprising means for subjecting a test sample to a varying magnetizing field, means for producing an electron stream, two orthogonally arranged electrostatic deflecting means for controlling the direction of said stream, means for applying to one of said deflecting means a voltage proportional to said varying magnetizing field, and means for applying to said other deflecting means a voltage proportional to the time rate of change of the resulting magnetic induction in the sample.

11. A magnetic testing system comprising means for subjecting a test sample to a magnetizing field varying at a constant time rate from a maxium negative field value to a maximum positive field value and varying at said rate from said positive value to said negative value, a Braun tube comprising two orthogonal pairs of deflector plates and means for passing an electron stream between each of said pairs of plates, means for applying across one of said pairs of plates a voltage proportional to said varying magnetizing field, and means for applying across said other pair of plates a voltage proportional to the time rate of change of the magnetic induction produced in the sample by said varying magnetizing field.

12. In combination, a circuit and means for producing therein a current varying at a constant time rate from a maximum negative current value to a maximum positive current value, and varying at said rate from said positive value to said negative value, said means comprising four impedance elements, a contact movable along said elements, connections for including said contact and a variable portion of any one of said impedance elements in said circuit to vary the amount of impedance introduced in said circuit by that element, and means for supplying direct current of one sign to said circuit when either of two of said impedance elements is in circuit and for supplying direct current of the opposite sign to said circuit when either of the other two of said impedance elements is in circuit, said impedance elements each having an impedance varying in an inverse manner with the length of the element.

In witness whereof, I hereunto subscribe my name this 2 day of August A. D., 1923.

JOHN B. JOHNSON.